(12) United States Patent
Carr

(10) Patent No.: US 11,601,258 B2
(45) Date of Patent: Mar. 7, 2023

(54) SELECTOR DERIVED ENCRYPTION SYSTEMS AND METHODS

(71) Applicant: Enveil, Inc., Fulton, MD (US)

(72) Inventor: Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 223 days.

(21) Appl. No.: 17/066,374

(22) Filed: Oct. 8, 2020

(65) Prior Publication Data

US 2022/0116200 A1    Apr. 14, 2022

(51) Int. Cl.
*H04L 9/06* (2006.01)
*H04L 9/08* (2006.01)

(52) U.S. Cl.
CPC .......... *H04L 9/0643* (2013.01); *H04L 9/0822* (2013.01); *H04L 9/0838* (2013.01); *H04L 9/0861* (2013.01)

(58) Field of Classification Search
CPC ... H04L 9/0643; H04L 9/0822; H04L 9/0838; H04L 9/0861; H04L 9/008; G06F 21/6254
See application file for complete search history.

(56) References Cited

U.S. PATENT DOCUMENTS

| | | | |
|---|---|---|---|
| 5,732,390 A | 3/1998 | Katayanagi et al. |
| 6,178,435 B1 | 1/2001 | Schmookler |
| 6,745,220 B1 | 6/2004 | Hars |
| 6,748,412 B2 | 6/2004 | Ruehle |
| 6,910,059 B2 | 6/2005 | Lu et al. |
| 7,712,143 B2 | 5/2010 | Comlekoglu |
| 7,849,185 B1 | 12/2010 | Rockwood |
| 7,870,398 B2 | 1/2011 | Perng et al. |
| 7,937,270 B2 | 5/2011 | Smaragdis et al. |
| 8,515,058 B1 | 8/2013 | Gentry |
| 8,565,435 B2 | 10/2013 | Gentry et al. |
| 8,781,967 B2 | 7/2014 | Tehranchi et al. |
| 8,832,465 B2 | 9/2014 | Gulati et al. |
| 9,059,855 B2 | 6/2015 | Johnson et al. |
| 9,094,378 B1 | 7/2015 | Yung et al. |
| 9,189,411 B2 | 11/2015 | Mckeen et al. |
| 9,215,219 B1 | 12/2015 | Krendelev et al. |
| 9,288,039 B1 | 3/2016 | Monet et al. |
| 9,491,111 B1 | 11/2016 | Roth et al. |

(Continued)

FOREIGN PATENT DOCUMENTS

| EP | 2887607 A1 | 6/2015 |
|---|---|---|
| EP | 2873186 B1 | 3/2018 |

(Continued)

OTHER PUBLICATIONS

Fan et al., "Somewhat Practical Fully Homomorphic Encryption", IACR Cryptol. ePrintArch. 2012, 19 pages.

(Continued)

*Primary Examiner* — Brian F Shaw
*Assistant Examiner* — Jeongsook Yi
(74) *Attorney, Agent, or Firm* — Carr & Ferrell LLP

(57) ABSTRACT

Example selector derived encryption methods and systems include creating a hashed and encrypted database, as well as performing a query against the hashed and encrypted database using an encrypted selector exchange protocol to prevent the exposure of extraneous data from the hashed and encrypted database.

20 Claims, 7 Drawing Sheets

(56) References Cited

U.S. PATENT DOCUMENTS

| | | |
|---|---|---|
| 9,503,432 B2 | 11/2016 | El Emam et al. |
| 9,514,317 B2 | 12/2016 | Martin et al. |
| 9,565,020 B1 | 2/2017 | Camenisch et al. |
| 9,577,829 B1 | 2/2017 | Roth et al. |
| 9,652,609 B2 | 5/2017 | Kang et al. |
| 9,846,787 B2 | 12/2017 | Johnson et al. |
| 9,852,306 B2 | 12/2017 | Cash et al. |
| 9,942,032 B1 | 4/2018 | Kornaropoulos et al. |
| 9,946,810 B1 | 4/2018 | Trepetin et al. |
| 9,973,334 B2 | 5/2018 | Hibshoosh et al. |
| 10,027,486 B2 | 7/2018 | Liu |
| 10,055,602 B2 | 8/2018 | Deshpande et al. |
| 10,073,981 B2 | 9/2018 | Arasu et al. |
| 10,075,288 B1 | 9/2018 | Khedr et al. |
| 10,120,893 B1 | 11/2018 | Rocamora et al. |
| 10,129,028 B2 | 11/2018 | Kamakari et al. |
| 10,148,438 B2 | 12/2018 | Evancich et al. |
| 10,181,049 B1 | 1/2019 | El Defrawy et al. |
| 10,210,266 B2 | 2/2019 | Antonopoulos et al. |
| 10,235,539 B2 | 3/2019 | Ito et al. |
| 10,255,454 B2 | 4/2019 | Kamara et al. |
| 10,333,715 B2 | 6/2019 | Chu et al. |
| 10,375,042 B2 | 8/2019 | Chaum |
| 10,396,984 B2 | 8/2019 | French et al. |
| 10,423,806 B2 | 9/2019 | Cerezo Sanchez |
| 10,489,604 B2 | 11/2019 | Yoshino et al. |
| 10,496,631 B2 | 12/2019 | Tschudin et al. |
| 10,644,876 B2 | 5/2020 | Williams et al. |
| 10,693,627 B2 | 6/2020 | Carr |
| 10,721,057 B2 | 7/2020 | Carr |
| 10,728,018 B2 | 7/2020 | Williams et al. |
| 10,771,237 B2 | 9/2020 | Williams et al. |
| 10,790,960 B2 | 9/2020 | Williams et al. |
| 10,817,262 B2 | 10/2020 | Carr et al. |
| 10,873,568 B2 | 12/2020 | Williams |
| 10,880,275 B2 | 12/2020 | Williams |
| 10,902,133 B2 | 1/2021 | Williams et al. |
| 10,903,976 B2 | 1/2021 | Williams et al. |
| 10,972,251 B2 | 4/2021 | Carr |
| 11,196,540 B2 | 12/2021 | Williams et al. |
| 11,196,541 B2 | 12/2021 | Williams et al. |
| 11,290,252 B2 | 3/2022 | Carr |
| 2002/0032712 A1 | 3/2002 | Miyasaka et al. |
| 2002/0073316 A1 | 6/2002 | Collins et al. |
| 2002/0104002 A1 | 8/2002 | Nishizawa et al. |
| 2003/0037087 A1 | 2/2003 | Rarick |
| 2003/0059041 A1 | 3/2003 | MacKenzie et al. |
| 2003/0110388 A1 | 6/2003 | Pavlin et al. |
| 2004/0167952 A1 | 8/2004 | Gueron et al. |
| 2004/0250100 A1* | 12/2004 | Agrawal ............ G06F 21/6227 713/193 |
| 2005/0008152 A1 | 1/2005 | MacKenzie |
| 2005/0076024 A1 | 4/2005 | Takatsuka et al. |
| 2005/0259817 A1 | 11/2005 | Ramzan et al. |
| 2006/0008080 A1 | 1/2006 | Higashi et al. |
| 2006/0008081 A1 | 1/2006 | Higashi et al. |
| 2007/0053507 A1 | 3/2007 | Smaragdis et al. |
| 2007/0095909 A1 | 5/2007 | Chaum |
| 2007/0140479 A1 | 6/2007 | Wang et al. |
| 2007/0143280 A1 | 6/2007 | Wang et al. |
| 2009/0037504 A1 | 2/2009 | Hussain |
| 2009/0083546 A1 | 3/2009 | Staddon et al. |
| 2009/0193033 A1 | 7/2009 | Ramzan et al. |
| 2009/0268908 A1 | 10/2009 | Bikel et al. |
| 2009/0279694 A1 | 11/2009 | Takahashi et al. |
| 2009/0287837 A1 | 11/2009 | Felsher |
| 2010/0202606 A1 | 8/2010 | Almeida |
| 2010/0205430 A1 | 8/2010 | Chiou et al. |
| 2010/0241595 A1 | 9/2010 | Felsher |
| 2011/0026781 A1 | 2/2011 | Osadchy et al. |
| 2011/0107105 A1 | 5/2011 | Hada |
| 2011/0110525 A1 | 5/2011 | Gentry |
| 2011/0243320 A1 | 10/2011 | Halevi et al. |
| 2011/0283099 A1 | 11/2011 | Nath et al. |
| 2012/0039469 A1 | 2/2012 | Mueller et al. |
| 2012/0054485 A1 | 3/2012 | Tanaka et al. |
| 2012/0066510 A1 | 3/2012 | Weinman |
| 2012/0201378 A1 | 8/2012 | Nabeel et al. |
| 2012/0265794 A1 | 10/2012 | Niel |
| 2012/0265797 A1 | 10/2012 | Niel |
| 2013/0010950 A1 | 1/2013 | Kerschbaum |
| 2013/0051551 A1 | 2/2013 | El Aimani |
| 2013/0054665 A1 | 2/2013 | Felch |
| 2013/0114811 A1 | 5/2013 | Boufounos et al. |
| 2013/0148868 A1 | 6/2013 | Troncoso Pastoriza et al. |
| 2013/0170640 A1 | 7/2013 | Gentry |
| 2013/0191650 A1 | 7/2013 | Balakrishnan et al. |
| 2013/0195267 A1 | 8/2013 | Alessio et al. |
| 2013/0198526 A1 | 8/2013 | Goto |
| 2013/0216044 A1 | 8/2013 | Gentry et al. |
| 2013/0230168 A1 | 9/2013 | Takenouchi |
| 2013/0237242 A1 | 9/2013 | Oka et al. |
| 2013/0246813 A1 | 9/2013 | Mori et al. |
| 2013/0326224 A1 | 12/2013 | Yavuz |
| 2013/0339722 A1 | 12/2013 | Krendelev et al. |
| 2013/0339751 A1 | 12/2013 | Sun et al. |
| 2013/0346741 A1 | 12/2013 | Kim et al. |
| 2013/0346755 A1 | 12/2013 | Nguyen et al. |
| 2014/0164758 A1 | 6/2014 | Ramamurthy et al. |
| 2014/0189811 A1 | 7/2014 | Taylor et al. |
| 2014/0233727 A1 | 8/2014 | Rohloff et al. |
| 2014/0281511 A1 | 9/2014 | Kaushik et al. |
| 2014/0355756 A1 | 12/2014 | Iwamura et al. |
| 2015/0100785 A1 | 4/2015 | Joye et al. |
| 2015/0100794 A1 | 4/2015 | Joye et al. |
| 2015/0205967 A1 | 7/2015 | Naedele et al. |
| 2015/0215123 A1 | 7/2015 | Kipnis et al. |
| 2015/0227930 A1 | 8/2015 | Quigley et al. |
| 2015/0229480 A1 | 8/2015 | Joye et al. |
| 2015/0244517 A1 | 8/2015 | Nita |
| 2015/0248458 A1 | 9/2015 | Sakamoto |
| 2015/0304736 A1 | 10/2015 | Lal et al. |
| 2015/0358152 A1 | 12/2015 | Ikarashi et al. |
| 2015/0358153 A1 | 12/2015 | Gentry |
| 2016/0004874 A1 | 1/2016 | Toannidis et al. |
| 2016/0036826 A1 | 2/2016 | Pogorelik et al. |
| 2016/0072623 A1 | 3/2016 | Joye et al. |
| 2016/0105402 A1 | 4/2016 | Soon-Shiong et al. |
| 2016/0105414 A1 | 4/2016 | Bringer et al. |
| 2016/0119346 A1 | 4/2016 | Chen et al. |
| 2016/0140348 A1 | 5/2016 | Nawaz et al. |
| 2016/0179945 A1 | 6/2016 | Lastra Diaz et al. |
| 2016/0182222 A1 | 6/2016 | Rane et al. |
| 2016/0323098 A1 | 11/2016 | Bathen |
| 2016/0335450 A1 | 11/2016 | Yoshino et al. |
| 2016/0344557 A1 | 11/2016 | Chabanne et al. |
| 2016/0350648 A1 | 12/2016 | Gilad-Bachrach et al. |
| 2017/0070340 A1 | 3/2017 | Hibshoosh et al. |
| 2017/0070351 A1 | 3/2017 | Yan |
| 2017/0099133 A1 | 4/2017 | Gu et al. |
| 2017/0134158 A1 | 5/2017 | Pasol et al. |
| 2017/0185776 A1 | 6/2017 | Robinson et al. |
| 2017/0264426 A1 | 9/2017 | Joye et al. |
| 2017/0366562 A1 | 12/2017 | Zhang et al. |
| 2018/0091466 A1 | 3/2018 | Friedman et al. |
| 2018/0139054 A1 | 5/2018 | Chu et al. |
| 2018/0198601 A1 | 7/2018 | Laine et al. |
| 2018/0204284 A1 | 7/2018 | Cerezo Sanchez |
| 2018/0212751 A1 | 7/2018 | Williams et al. |
| 2018/0212752 A1 | 7/2018 | Williams et al. |
| 2018/0212753 A1 | 7/2018 | Williams |
| 2018/0212754 A1 | 7/2018 | Williams et al. |
| 2018/0212755 A1 | 7/2018 | Williams et al. |
| 2018/0212756 A1 | 7/2018 | Carr |
| 2018/0212757 A1 | 7/2018 | Carr |
| 2018/0212758 A1 | 7/2018 | Williams et al. |
| 2018/0212759 A1 | 7/2018 | Williams et al. |
| 2018/0212775 A1 | 7/2018 | Williams |
| 2018/0212933 A1 | 7/2018 | Williams |
| 2018/0224882 A1 | 8/2018 | Carr |
| 2018/0234254 A1 | 8/2018 | Camenisch et al. |
| 2018/0267981 A1 | 9/2018 | Sirdey et al. |
| 2018/0270046 A1 | 9/2018 | Carr |
| 2018/0276417 A1 | 9/2018 | Cerezo Sanchez |

(56) References Cited

U.S. PATENT DOCUMENTS

| | | | |
|---|---|---|---|
| 2018/0343109 A1 | 11/2018 | Koseki et al. | |
| 2018/0349632 A1 | 12/2018 | Bent et al. | |
| 2018/0359097 A1 | 12/2018 | Lindell | |
| 2018/0373882 A1 | 12/2018 | Veugen | |
| 2019/0013950 A1 | 1/2019 | Becker et al. | |
| 2019/0042786 A1 | 2/2019 | Williams et al. | |
| 2019/0108350 A1 | 4/2019 | Bohli et al. | |
| 2019/0158272 A1 | 5/2019 | Chopra et al. | |
| 2019/0229887 A1 | 7/2019 | Ding et al. | |
| 2019/0238311 A1 | 8/2019 | Zheng | |
| 2019/0251553 A1 | 8/2019 | Ma et al. | |
| 2019/0251554 A1 | 8/2019 | Ma et al. | |
| 2019/0253235 A1 | 8/2019 | Zhang et al. | |
| 2019/0260585 A1 | 8/2019 | Kawai et al. | |
| 2019/0266282 A1 | 8/2019 | Mitchell et al. | |
| 2019/0280880 A1 | 9/2019 | Zhang et al. | |
| 2019/0312728 A1 | 10/2019 | Poeppelmann | |
| 2019/0327078 A1 | 10/2019 | Zhang et al. | |
| 2019/0334716 A1 | 10/2019 | Kocsis et al. | |
| 2019/0349191 A1 | 11/2019 | Soriente et al. | |
| 2019/0371106 A1 | 12/2019 | Kaye | |
| 2020/0076578 A1* | 3/2020 | Ithal | G06F 21/6227 |
| 2020/0134200 A1 | 4/2020 | Williams et al. | |
| 2020/0150930 A1 | 5/2020 | Carr et al. | |
| 2020/0204341 A1 | 6/2020 | Williams et al. | |
| 2020/0382274 A1 | 12/2020 | Williams et al. | |
| 2020/0396053 A1 | 12/2020 | Williams et al. | |
| 2021/0034299 A1* | 2/2021 | Naqvi | H04L 9/3271 |
| 2021/0034765 A1 | 2/2021 | Williams et al. | |
| 2021/0105256 A1 | 4/2021 | Williams | |
| 2021/0409191 A1 | 12/2021 | Williams et al. | |
| 2022/0006629 A1 | 1/2022 | Williams et al. | |

FOREIGN PATENT DOCUMENTS

| | | |
|---|---|---|
| JP | 5680007 B2 | 3/2015 |
| KR | 101386294 B1 | 4/2014 |
| WO | WO2014105160 A1 | 7/2014 |
| WO | WO2015094261 A1 | 6/2015 |
| WO | WO2016003833 A1 | 1/2016 |
| WO | WO2016018502 A1 | 2/2016 |
| WO | WO2018091084 A1 | 5/2018 |
| WO | WO2018136801 A1 | 7/2018 |
| WO | WO2018136804 A1 | 7/2018 |
| WO | WO2018136811 A1 | 7/2018 |

OTHER PUBLICATIONS

"Microsoft Computer Dictionary", pp. 276 and 529, Microsoft Press, 5th Edition, ISBN 0735614954,2002, (Year: 2002), 4 pages.
"Homomorphic encryption", Wikipedia, May 22, 2021, pages.
"International Search Report" and "Written Opinion of the International Searching Authority," Patent Cooperation Treaty Application No. PCT/US2018/014535, dated Apr. 19, 2018, 9 pages.
"International Search Report" and "Written Opinion of the International Searching Authority," Patent Cooperation Treaty Application No. PCT/US2018/014530, dated Apr. 23, 2018, 7 pages.
"International Search Report" and "Written Opinion of the International Searching Authority," Patent Cooperation Treaty Application No. PCT/US2018/014551, dated Apr. 24, 2018, 8 pages.
Petition to Insitute Derivation Proceeding Pursuant to 35 USC 135; Case No. DER2019-00009, US Patent and Trademark Office Patent Trial and Appeal Board; Jul. 26, 2019, 272 pages. (2 PDFs).
SCAMP Working Paper L29/11, "A Woods Hole Proposal Using Striping," Dec. 2011, 14 pages.
O'Hara, Michael James, "Shovel-ready Private Information Retrieval," Dec. 2015, 4 pages.
Carr, Benjamin et al., "Proposed Laughing Owl," NSA Technical Report, Jan. 5, 2016, 18 pages.
Williams, Ellison Anne et al., "Wideskies: Scalable Private Information Retrieval," Jun. 8, 2016, 14 pages.
Carr, Benjamin et al., "A Private Stream Search Technique," NSA Technical Report, Dec. 1, 2015, 18 pages.
Drucker et al., "Paillier-encrypted databases with fast aggregated queries," 2017 14th IEEE Annual Consumer Communications & Networking Conference (CCNC), Jan. 8-11, 2017, pp. 848-853.
Tu et al., "Processing Analytical Queries over Encrypted Data," Proceedings of the VLDB Endowment, vol. 6, Issue No. 5, Mar. 13, 2013. pp. 289-300.
Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.
Chen et al., "Efficient Multi-Key Homomorphic Encryption with Packed Ciphertexts with Application to Oblivious Neural Network Inference", CCS '19 Proceedings of the 2019 ACM SIGSAC Conference on Computer and Communications Security, May 19, 2019. pp. 395-412.
Armknecht et al., "A Guide to Fully Homomorphic Encryption" IACR Cryptology ePrint Archive: Report 2015/1192 [online], Dec. 14, 2015, 35 pages.
Bayar et al., "A Deep Learning Approach To Universal Image Manipulation Detection Using A New Convolutional Layer", IH&MMSec 2016, Jun. 20-22, 2016. pp. 5-10.
Juvekar et al. "Gazelle: A Low Latency Framework for Secure Neural Network Inference", 27th USENIX Security Symposium, Aug. 15-17, 2018. pp. 1650-1668.
Bösch et al.," SOFIR: Securely Outsourced Forensic Recognition," 2014 IEEE International Conference on Acoustic, Speech and Signal Processing (ICASSP), IEEE 978-1-4799-2893-4/14, 2014, pp. 2713-2717.
Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.
Bajpai et al., "A Fully Homomorphic Encryption Implementation on Cloud Computing," International Journal of Information & Computation Technology, ISSN 0974-2239 vol. 4, No. 8, 2014, pp. 811-816.
Viejo et al., "Asymmetric homomorphisms for secure aggregation in heterogeneous scenarios," Information Fusion 13, Elsevier B.V., Mar. 21, 2011, pp. 285-295.
Patil et al., "Big Data Privacy Using Fully Homomorphic Non-Deterministic Encryption," IEEE 7th International Advance Computing Conference, Jan. 5-7, 2017, 15 pages.
Panda et al., "FPGA Prototype of Low Latency BBS PRNG," IEEE International Symposium on Nanoelectronic and Information Systems, Dec. 2015, pp. 118-123, 7 pages.
Sahu et al., "Implementation of Modular Multiplication for RSA Algorithm," 2011 International Conference on Communication Systems and Network Technologies, 2011, pp. 112-114, 3 pages.
Drucker et al., "Achieving trustworthy Homomorphic Encryption by combining it with a Trusted Execution Environment," Journal of Wireless Mobile Networks, Ubiquitous Computing, and Dependable Application (JoWUA), Mar. 2018, pp. 86-99.
Google Scholar, search results for "trusted execution environment database", 2 pages, Aug. 1, 2020.
PIRK Code Excerpt—QuerierDriver, https://github.com/apache/incubator-retired-pirk/blob/master/src/main/java/org/apache/pirk/querier/wideskies/QuerierDriver.java; Jul. 11, 2016; 5 pages.
PIRK Code Excerpt—QuerierDriverCLI, https://github.com/apache/incubator-retired-pirk/blob/master/src/main/java/org/apache/pirk/querier/wideskies/QuerierCLI.java; Jul. 11, 2016; 9 pages.
PIRK Code Excerpt—Query; [online]; Retreived from the Internet: <URL: https://github.com/apache/incubator-retired-pirk/blob/master/src/main/java/org/apache/pirk/query/wideskies/Query.java>; Jul. 11, 2016; 7 pages.
PIRK Code Excerpt—QueryInfo; [online]; Retreived from the Internet: <URL: https://github.com/apache/incubator-retired-pirk/blob/master/src/main/java/org/apache/pirk/query/wideskies/QueryInfo.java>; Jul. 11, 2016; 4 pages.

(56) References Cited

OTHER PUBLICATIONS

PIRK Code Excerpt—ComputeResponse; [online]; Retreived from the Internet: <URL: https://github.com/apache/incubator-retired-pirk/blob/master/src/main/java/org/apache/pirk/responder/wideskies/spark/ComputeResponse.java>; Jul. 11, 2016; 8 pages.

PIRK Code Excerpt—HashSelectorsAndPartitionData; [online]; Retreived from the Internet: <URL: https://github.com/apache/incubator-retired-pirk/blob/master/src/main/java/org/apache/pirk/responder/wideskies/spark/HashSelectorsAndPartitionData.java>; Jul. 11, 2016; 2 pages.

PIRK Code Excerpt—HashSelectorsAndFormPartitionsBigInteger; [online]; Retreived from the Internet: <URL: https://github.com/apache/incubator-retired-pirk/blob/master/src/main/java/org/apache/pirk/responder/wideskies/common/HashSelectorAndPartitionData.java>; Jul. 11, 2016; 3 pages.

PIRK Code Excerpt—QueryUtils; [online]; Retreived from the Internet: <URL: https://github.com/apache/incubator-retired-pirk/blob/master/src/main/java/org/apache/pirk/query/wideskies/QueryUtils.java>; Jul. 11, 2016; 8 pages.

PIRK Code Excerpt—QuerySchema; [online]; Retreived from the Internet: <URL: https://github.com/apache/incubator-retired-pirk/blob/master/src/main/java/org/apache/pirk/schema/query/QuerySchema.java>; Jul. 11, 2016; 3 pages.

"PIRK Proposal" Apache.org [online], [retreived on Oct. 28, 20]; Retreived from the Internet: <URL:https://cwiki.apache.org/confluence/display/incubator/PirkProposal>; Apr. 10, 2019; 5 pages.

\* cited by examiner

SELECTOR DERIVED ENCRYPTION SYSTEMS AND METHODS

CROSS-REFERENCE TO RELATED APPLICATIONS

N/A.

TECHNICAL FIELD

This disclosure relates to the technical field of encryption, and more specifically, but not by limitation to systems and methods that prevent unauthorized disclosure of data through the use of selector derived encryption.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method includes generating, by a responder, a hashed and encrypted database from a cleartext database by: encrypting selectors of the cleartext database using a responder key of a commutative encryption scheme, each selector being assigned a bucket identifier; encrypting rows of the cleartext database with responder derived keys generated from the encrypted selectors; grouping the encrypted rows according to bucket identifiers; determining a hash bucket identifier of a query based on a requested selector of a query; and returning at least two encrypted rows corresponding to the hash bucket identifier, the at least two encrypted rows comprising at least one encrypted row that does not correspond to the requested selector, but was based on a bucket identifier collision, and at least one encrypted row that does correspond to the requested selector; and performing an encrypted selector exchange protocol that comprises: encrypting the requested selector a first time, by a querier, using a querier key of a commutative encryption scheme; encrypting the requested selector a second time, by the responder, using the responder key to create a twice encrypted selector; receiving, by the querier, the twice encrypted selector; decrypting, by the querier, the twice encrypted selector using the querier key to obtain the requested selector that was encrypted with the responder key; and deriving, by the querier, the responder derived key used to encrypt the at least one encrypted row that does correspond to the requested selector to recover the cleartext corresponding to the least one encrypted row, the querier being unable to decrypt the at least one encrypted row that does not correspond to the requested selector.

According to one example embodiment of the present disclosure, a method includes determining a hash bucket identifier from a requested selector of a query; obtaining at least two encrypted rows from a hashed and encrypted database that correspond to the hash bucket identifier, the at least two encrypted rows comprising at least one encrypted row that does not correspond to the requested selector, but was based on a bucket identifier collision, and at least one encrypted row that does correspond to the requested selector; and performing an encrypted selector exchange protocol that comprises: encrypting the requested selector a first time using a querier key; encrypting the requested selector a second time using a responder key to create a twice encrypted selector; decrypting the twice encrypted selector using the querier key to obtain the requested selector that was encrypted with the responder key; deriving the responder derived key used to encrypt the at least one encrypted row that does correspond to the requested selector; and recovering cleartext corresponding to the least one encrypted row using the responder derived key, wherein the at least one encrypted row that does not correspond to the requested selector cannot be decrypted using the responder derived key.

According to one example embodiment of the present disclosure, a system includes a responder comprising a processor; and memory for storing instructions, the processor executes the instructions to generate a hashed and encrypted database from a cleartext database as the responder: encrypts selectors of the cleartext database using a responder key, each selector being assigned a bucket identifier; encrypts rows of the cleartext database with responder derived keys generated from the encrypted selectors; groups the encrypted rows according to bucket identifiers; determines a hash bucket identifier of a query based on a requested selector of a query; and returns at least two encrypted rows corresponding to the hash bucket identifier, the at least two encrypted rows comprising at least one encrypted row that does not correspond to the requested selector, but was based on a bucket identifier collision, and at least one encrypted row that does correspond to the requested selector.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXEMPLARY EMBODIMENTS

The present disclosure pertains to encryption services and systems, and more particularly to selector derived encryption. Generally, selector derived encryption provides advantages over other encryption techniques and can be used to prevent or mitigate issues that may arise when cleartext data could be inadvertently exposed due to issues such as hash collisions. By way of example, hash collisions may occur when using methods such as hash-based private information retrieval (HPIR). Generally, in HPIR a hashed database is created from a cleartext database. The hashed database is used as an argument in a protocol for private information retrieval. In response to a query, data can be retrieved from the cleartext database using data obtained from the hashed database. When a hash collision occurs, two or more database entries may be returned in response to the query, rather than a single database entry. This may preclude the usage of HPIR in use cases where returning data from hash collisions is undesirable, or prohibited by some policy or regulation.

The systems and methods disclosed herein provide advantages over HPIR by implementing selector derived encryption (SDE) that prevents or mitigates hash collisions. Broadly, SDE utilizes a commutative encryption scheme. In some embodiments, the commutative encryption scheme is deterministic and can be used to encrypt a cleartext database into a hashed and encrypted database. A querier can provide a selector that is used to query the hashed and encrypted database provided by a responder. The responder cannot determine what data were received by the querier. The querier can only receive data that matches their requested selector(s). The combined use of selector(s) and hashed and encrypted database identifies collisions and correspondingly limits inadvertent disclosure of information to the querier. Additional details with respect to the features are provided in greater detail herein with reference to the collective drawings.

Figure 1:
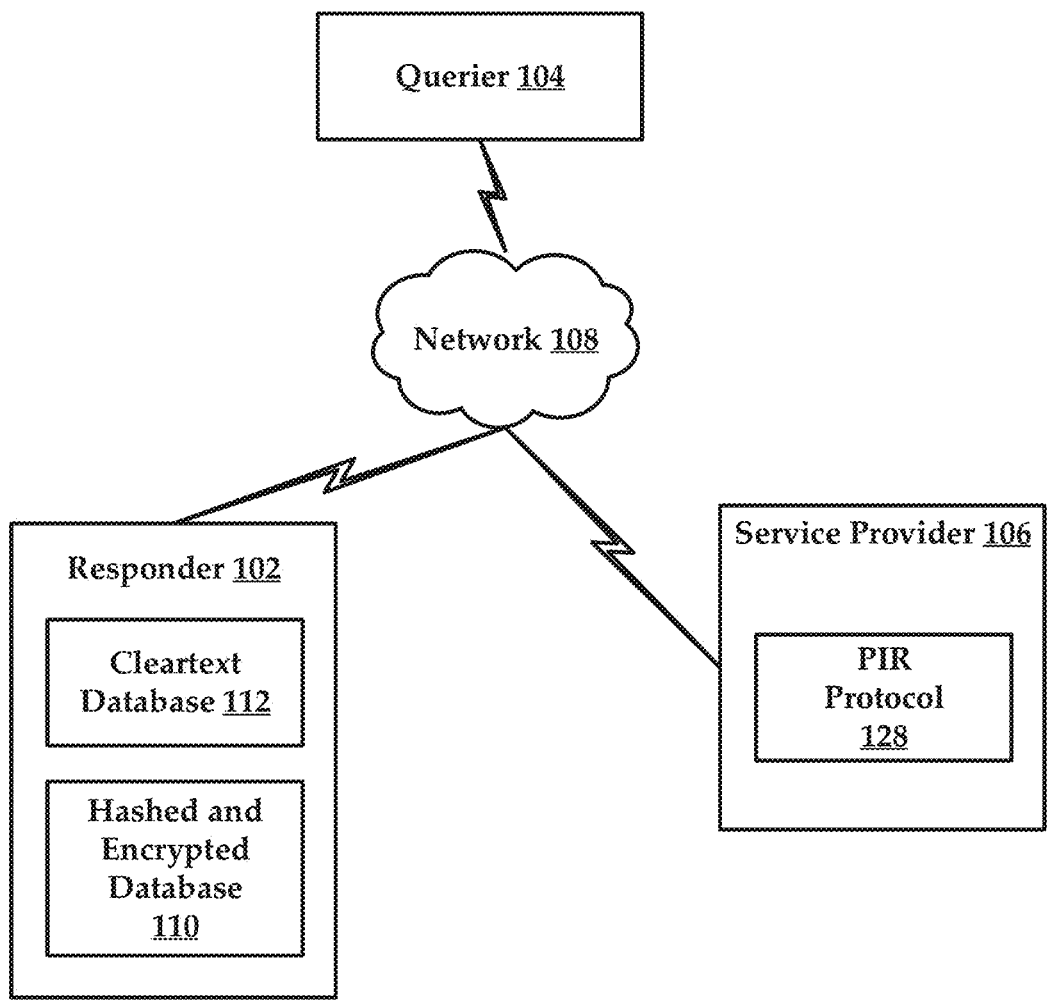
FIG. 1 is a block diagram of an example environment suitable for practicing methods for secure probabilistic analytics using an encrypted analytics matrix as described herein.

Turning now to the drawings, FIG. 1 depicts an illustrative architecture or illustrative architecture 100 in which techniques and structures of the present disclosure may be implemented. The architecture 100 includes a responder 102, a querier 104, and a service provider 106. Generally, each of the components of the architecture 100 can include a computer system that is programmed to perform the methods and operations disclosed herein. The components of the architecture 100 can communicate over a network 108. The network 108 can include any public and/or private network that would be known to one of ordinary skill in the art. To be sure, while the service provider 106 is illustrated as being separate from the responder 102, in some embodiments, the responder 102 can include the service provider 106. However, it will be understood that both the querier 104 and responder 102 each perform respective functions of the methods. When a service provider is not involved, the querier 104 may not send queries directly to the responder 102 as such an operation would be insecure.

In more detail, the responder 102 can create and maintain a hashed and encrypted database 110 that is created based upon a cleartext database 112. The hashed and encrypted database 110 is provided to the service provider 106 as in response to a query from the querier 104. The querier 104 transmits a query comprising a requested selector to the service provider 106 and receives a response from the service provider 106. In some instances, the response includes collision data from the hashed and encrypted database 110, as will be discussed in greater detail herein. In general, only the parts of the collision data that directly correspond to requested selector can be decrypted by the querier 104.

In more detail, the responder 102 can create the hashed and encrypted database 110 by leveraging a commutative encryption scheme. If an encryption function E(k,m) encrypts message m with a secret key k, a commutative encryption scheme satisfies E(a, E(b,m))=E(b, E(a,m)) for any two secret keys a and b. In other words, the commutative encryption scheme allows for the encryption of data with multiple keys and decryption of data with the same keys, applied in any order. The commutative encryption scheme is deterministic, meaning that all encryptions of the same message m with the same key k produce identical ciphertexts. This allows determinism when deriving keys from messages encrypted under this commutative encryption scheme.

Some embodiments use Elliptic-Curve Cryptography (ECC) as a basis for the commutative encryption scheme, but other example schemas include, but are not limited to, Pohlig-Hellman and/or Shamir, Rivest and Aldeman (SRA). The querier 104 and responder 102 each generate a secret key under this scheme. These keys are referred to as responder key R of the responder 102 and a querier key Q of the querier 104.

Figure 2:
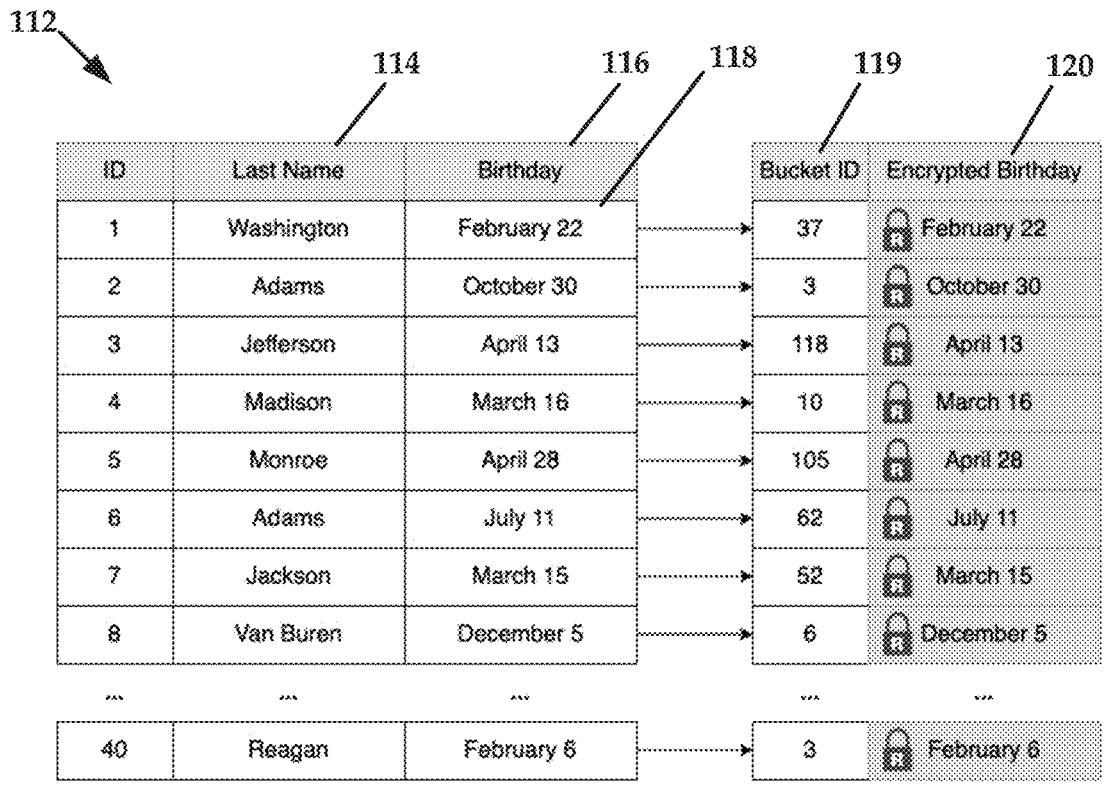
FIG. 2 illustrates an example cleartext database and corresponding process for encrypting selectors of the cleartext database.

In an initial process, the responder 102 encrypts each selector in the cleartext database 112 with their responder key R. Referring to FIGS. 1 and 2, the responder 102 extracts a selector for each row (rows 1-40) of the cleartext database 112. The cleartext database 112 includes a plurality of rows and columns (e.g., columns 114 and 116). As part of the query, the querier 104 specifies a function that will generate a selector for each row; this function can use any combination of columns and any deterministic transformations applied to these columns. In the FIGS. 2-6 the selector is constructed only from column 116 (Birthday).

The responder 102 encrypts the data of the column 116 using the responder key R from the commutative encryption scheme. The responder 102 also computes a hash bucket identifier (e.g., Bucket ID) for each entry by applying a hash function to the selector. The hashed and encrypted database includes column 119 that references Bucket IDs and another column 120 that comprises fields that include the encrypted data of the column 116 of the cleartext database 112 created using the responder key R. For example, the value of a field 118 is encrypted and assigned a Bucket ID of 37.

Figure 3:
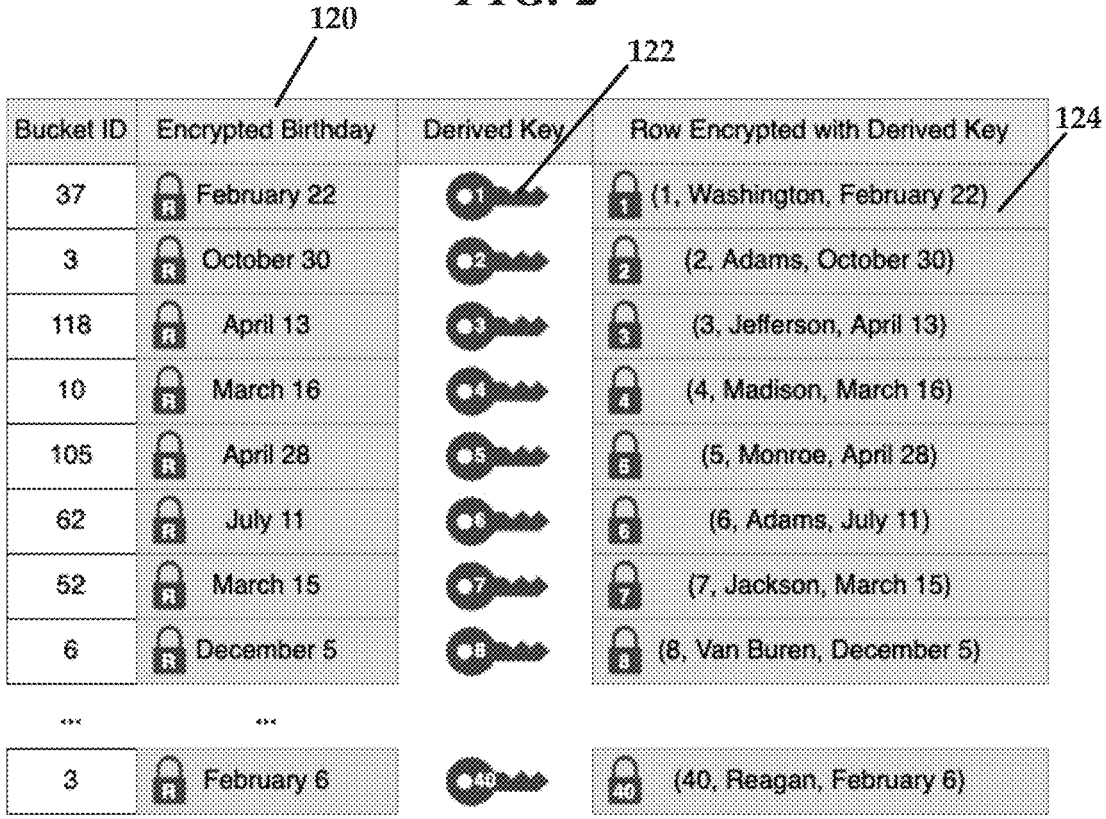
FIG. 3 illustrates an example process for encrypting rows of the cleartext database.

As best illustrated in FIG. 3, the responder 102 can generate responder derived keys (derived keys 1-40). For example, the responder 102 performs an Advanced Encryption Standard (AES) key derivation for each encrypted selector, by applying a cryptographic hash algorithm (for example, SHA256, but many others exist) to each ciphertext to transform each one into a format compatible for use as an AES key. This produces a different derived key for each selector/field in the cleartext database 112. The derived key for each row is then used to encrypt the full row's data. In FIGS. 1 and 3, the responder 102 can generate responder derived keys for each of the entries/fields of the column 120. For example, a responder derived key 122 is used to encrypt the row 1 (associated with Bucket ID 37) of the cleartext database 112 to produce an encrypted row 124. This process is repeated for each row of the cleartext database 112.

Figure 4:
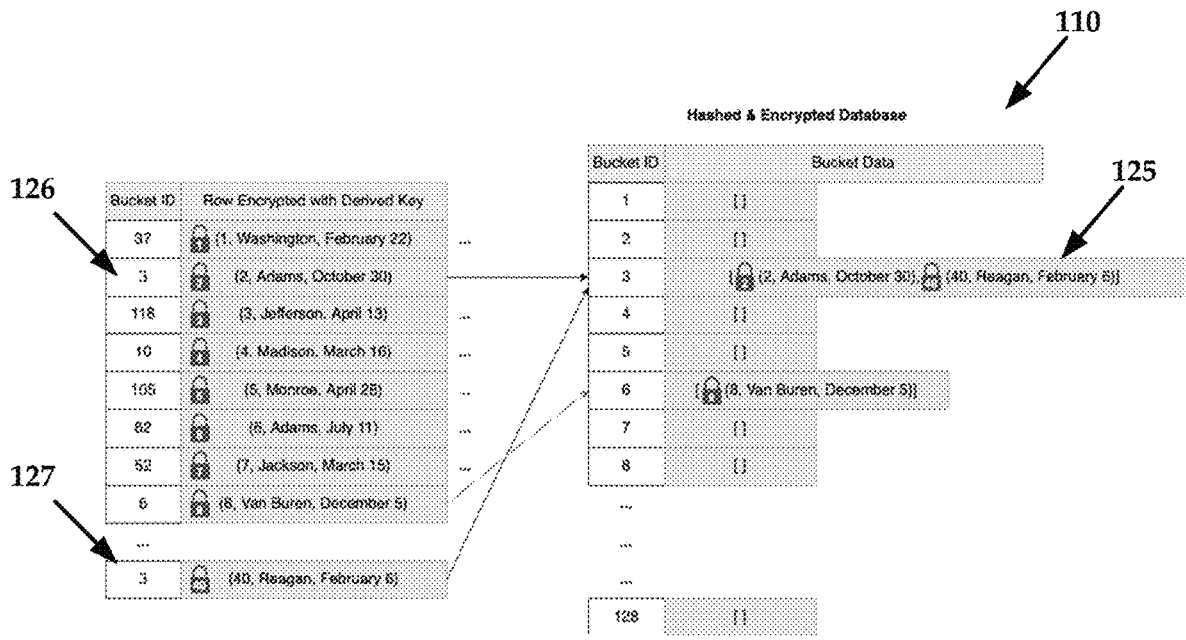
FIG. 4 illustrates an example process for grouping the encrypted rows into a hashed and encrypted database.

The responder 102 can then group the encrypted rows by their Bucket ID to produce the hashed and encrypted database 110, as illustrated in FIG. 4. The hashed and encrypted database 110 includes a collision between two encrypted rows that were both assigned a Bucket ID of '3'. These two encrypted rows are illustrated as being grouped together in a group 125. That is, row three of the hashed and encrypted database 110 illustrated in FIG. 4 includes at least two encrypted rows. For example, row three includes the data of group 125 obtained from at least one encrypted row (namely encrypted row 126) that does correspond to the requested selector 'October 30', and at least one encrypted row (namely encrypted row 127) that does not correspond to the requested selector 'October 30'.

Figure 5:
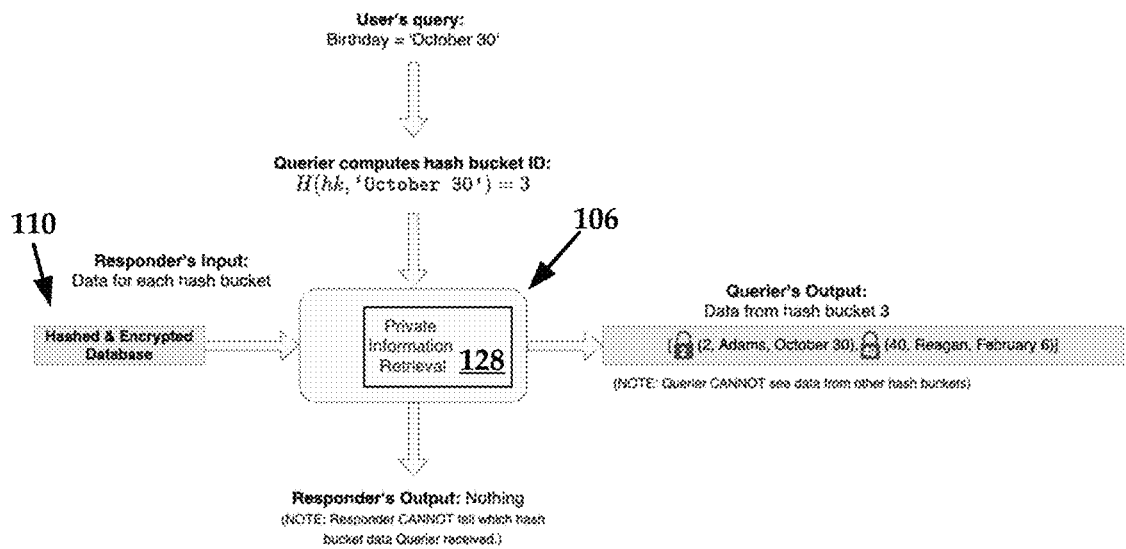
FIG. 5 is a flow diagram that illustrates the use of a hashed and encrypted database and a query to generate query output.

In FIGS. 1 and 5, the hashed and encrypted database 110 is used as the responder's input to a PIR protocol 128. Again, the PIR protocol 128 can be managed by the service provider 106 or it can be conducted between the querier and responder directly. The querier's input to PIR protocol 128 includes a hash bucket identifier that is generated using a hash function that is applied to the requested selector. Again, the requested selector 'October 30' and computed hash bucket identifier is '3'. The querier's input to PIR protocol 128 (i.e. the Bucket IDs of its desired selectors) remains unchanged, but the bucket data it receives contains rows encrypted with responder derived keys. For context, the requested selector is what the querier desires to query against the hashed and encrypted database 110. A selector as referred to above in the creation of the hashed and encrypted database 110 refers to entries or fields in the cleartext database 112.

It will be understood that the responder derived keys have not been transmitted as part of the PIR protocol, so the querier 104 cannot decrypt any of these data, unless the querier 104 receives the corresponding keys as part of an encrypted selector exchange (ESE) protocol described infra.

Figure 6:
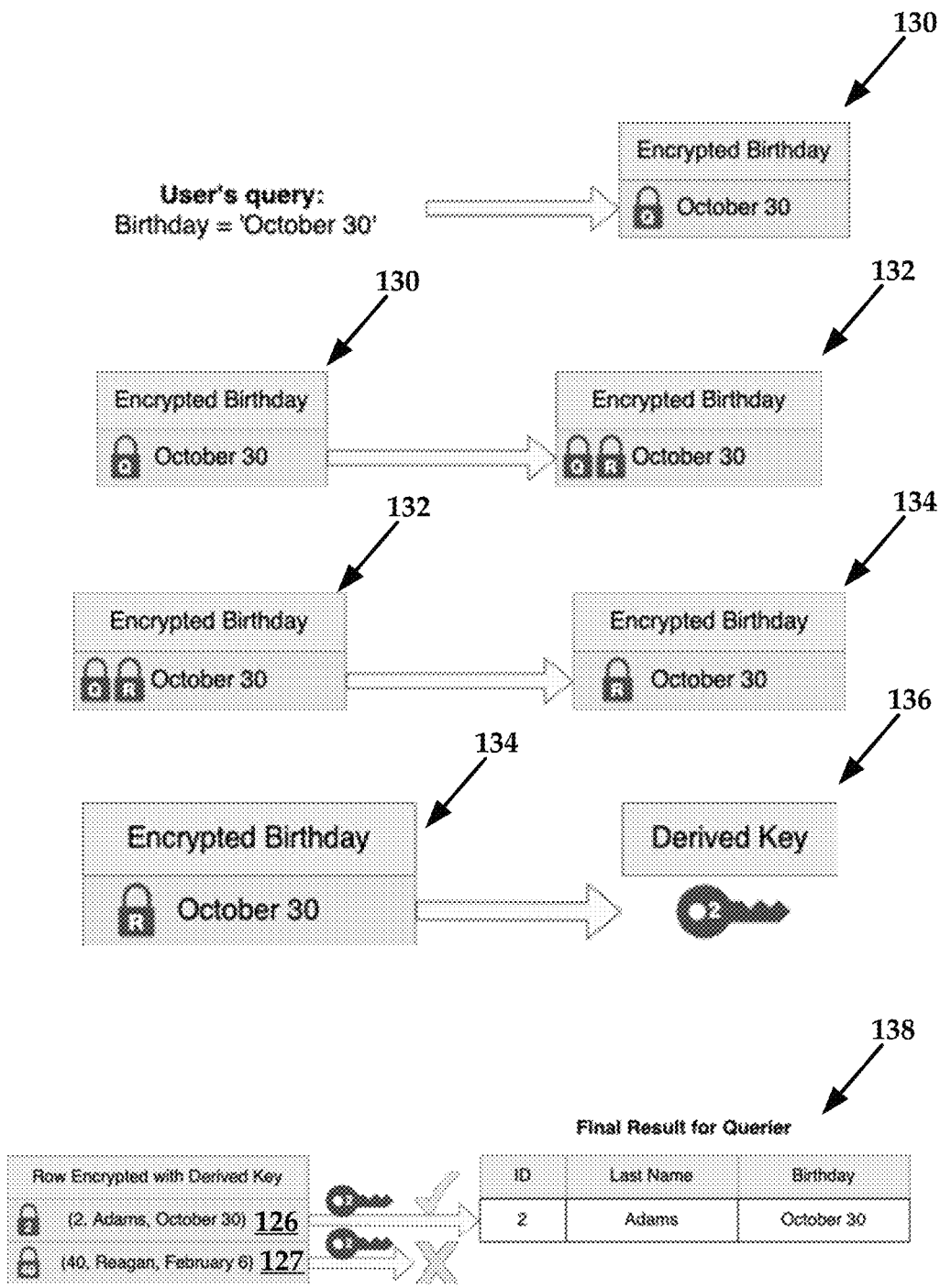
FIG. 6 illustrates an encrypted selector exchange process.

As best illustrated in FIGS. 1 and 6, the ESE protocol is an additional protocol between the querier 104 and responder 102 that runs in parallel with the PIR protocol. The querier 104 begins by taking each of the selectors (can be one or more selector) the querier 104 is requesting as part of the PIR protocol and encrypting them with its querier key Q. In this example, the query includes a birthday of 'October 30', and the querier 104 encrypts these data using the querier key Q into an encrypted selector 130.

The querier 104 then sends the encrypted selector to the responder 102. Note that the responder 102 does not receive the querier key Q, and therefore cannot decrypt the encrypted selector 130. Instead, the responder 102 encrypts the encrypted selector 130 again with its responder key R. The selector is now encrypted under both commutative encryption keys (e.g., the querier key Q and the responder key R) to produce a twice encrypted selector 132.

The responder 102 sends the twice encrypted selector 132 back to the querier 104. The querier 104 decrypts the twice encrypted selector 132 using the querier key Q. The result is the querier's selectors which were encrypted using the responder key R, referred to as the responder encrypted selector 134.

To be sure, the querier 104 learns these values without receiving or being able to learn the responder key R. Similarly, the responder 102 does not receive and is therefore unable to learn the value of the selector.

Next, the querier 104 derives an AES key from the responder encrypted selector 134, which corresponds to the responder derived key that was generated by the responder 102 when generating the encrypted rows of FIG. 3. Because the commutative encryption scheme used in this process is deterministic, the ciphertext the querier 104 now has for the selector is the same ciphertext used by the responder to derive its AES encryption keys for any rows that contain that selector. The querier 104 thus generates a responder derived key 136.

The querier 104 can then follow a similar key derivation process as described supra to obtain the same AES key used by the responder to encrypt cleartext data that contained the specified selector.

The requested selector 'October 30' was encrypted with the responder key R, and used to derive the AES key labeled 2 (e.g., derived key 136). The querier 104 can derive this same AES key, which is identical to that which was derived by the responder 102 when the responder created the encrypted row.

Note that the querier cannot derive the AES keys for any other selectors that it did not specify earlier, because it does not have the responder key R. Finally, after the PIR protocol is complete, the querier takes its selector-derived keys and attempts to decrypt each of the encrypted rows returned as part of the PIR protocol. This decryption will fail for any rows that were encrypted with keys the querier has not received. In the example illustration of FIG. 6, the key labeled 2 successfully decrypts the data of the encrypted row 126 which corresponds to (2, Adams, October 30), which corresponds to the requested selector 'October 30' and hash bucket identifier '3'.

Of note, both the encrypted rows 2 and 40 (corresponding to the encrypted row 126 and encrypted row 127 of FIG. 4, respectively) were returned, due to a collision that occurred when creating the hashed and encrypted database 110. Despite the collision, and the querier possessing both encrypted rows, the data of row 40 cannot be decrypted by the querier 104 because it only has the responder derived key for the encrypted row 126. This means that the querier 104 only receives plaintext data for the rows that contain the selector(s) it is interested in. Any rows that were returned as the result of a hash collision in the hash-based PIR protocol are undecryptable, and the querier 104 can discard them without ever having to worry about their data being present on its system. The querier 104 can then decrypt the encrypted row 126 to recover cleartext 138 of the encrypted row using the responder derived key 136 that was generated by the querier. The cleartext 138 of FIG. 6 corresponds to the cleartext of row 2 of the cleartext database of FIG. 2.

It will be understood that some of the embodiments disclosed herein contemplate avoiding the disclosure of data when collisions occur. However, the systems and methods herein are not so limited. Thus, the methods of querying using selector derived encryption may not always return data that was the subject of a collision. The systems and methods disclosed herein do not require that data returned from the selector derived encryption protocol contain some rows matching the selector and other rows not matching the selector.

For example, a querier can request a selector that is not in the database. For example, the querier can ask for "April 1" and the bucket ID for that is 2. The selector derived encryption algorithm would return no data, and there would be nothing to decrypt. If the bucket ID were 6 instead, it would return some data but none of it would be decryptable.

It is also possible for the querier to ask for a record that is in the database, but for no hash collisions to occur. In that case all of the records returned by the selector derived encryption algorithm would be decryptable. The purpose of SDE is to guard against the possibility of hash collisions.

Figure 7:
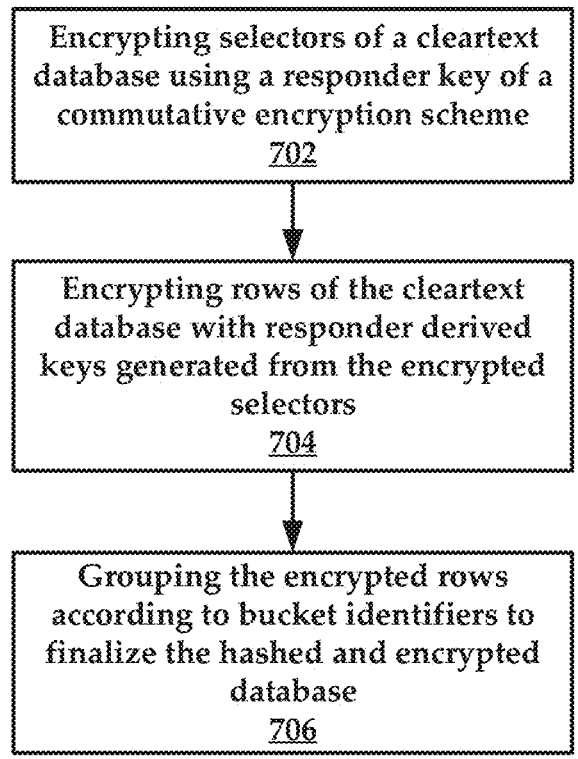
FIG. 7 is a flowchart of a method of the present disclosure.

FIG. 7 is a flowchart of an example method. The method includes aspects of generating a hashed and encrypted database by a responder. The method can include a step 702 of encrypting selectors of a cleartext database using a responder key of a commutative encryption scheme. As noted above, each selector can be assigned a bucket identifier.

Next, the method includes a step 704 of encrypting rows of the cleartext database with responder derived keys generated from the encrypted selectors. The method can include a step 706 of grouping the encrypted rows according to bucket identifiers to finalize the hashed and encrypted database.

Figure 8:
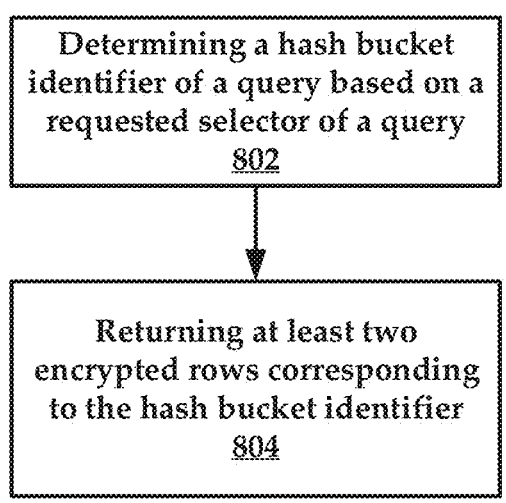
FIG. 8 is a flowchart of another method of the present disclosure.

FIG. 8 is a flowchart of a method related to querying the hashed and encrypted database created using the method of FIG. 7. The method can include a step 802 of determining a hash bucket identifier of a query based on a requested selector of a query. The method further includes a step 804 of returning at least two encrypted rows corresponding to the hash bucket identifier. As noted above, the at least two encrypted rows include at least one encrypted row that does not correspond to the requested selector, but was based on a bucket identifier collision, and at least one encrypted row that does correspond to the requested selector.

Figure 9:
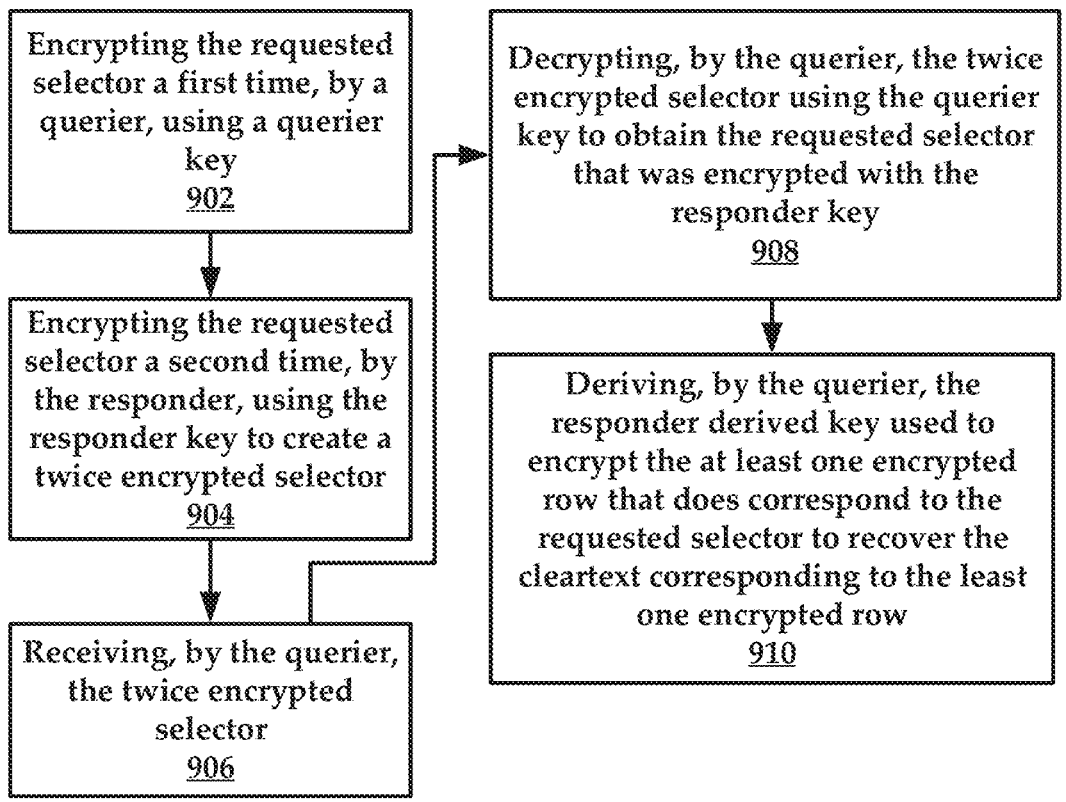
FIG. 9 is a flowchart of yet another method of the present disclosure.

FIG. 9 is a flowchart of a method for performing an encrypted selector exchange protocol. The method can be used in combination with the methods of FIGS. 7 and 8 to ensure that the querier can only decrypt the at least one encrypted row that does correspond to the requested selector. The method includes a step 902 of encrypting the requested selector a first time, by a querier, using a querier key. Next, the method can include a step 904 of encrypting the requested selector a second time, by the responder, using the responder key to create a twice encrypted selector. In some embodiments, the method can include a step 906 of receiving, by the querier, the twice encrypted selector, as well as a step 908 of decrypting, by the querier, the twice encrypted selector using the querier key to obtain the requested selector that was encrypted with the responder key.

In one embodiment, the method includes a step 910 of deriving, by the querier, the responder derived key used to encrypt the at least one encrypted row that does correspond to the requested selector to recover the cleartext corresponding to the least one encrypted row. As noted above, the querier is unable to decrypt the at least one encrypted row that does not correspond to the requested selector.

Figure 10:
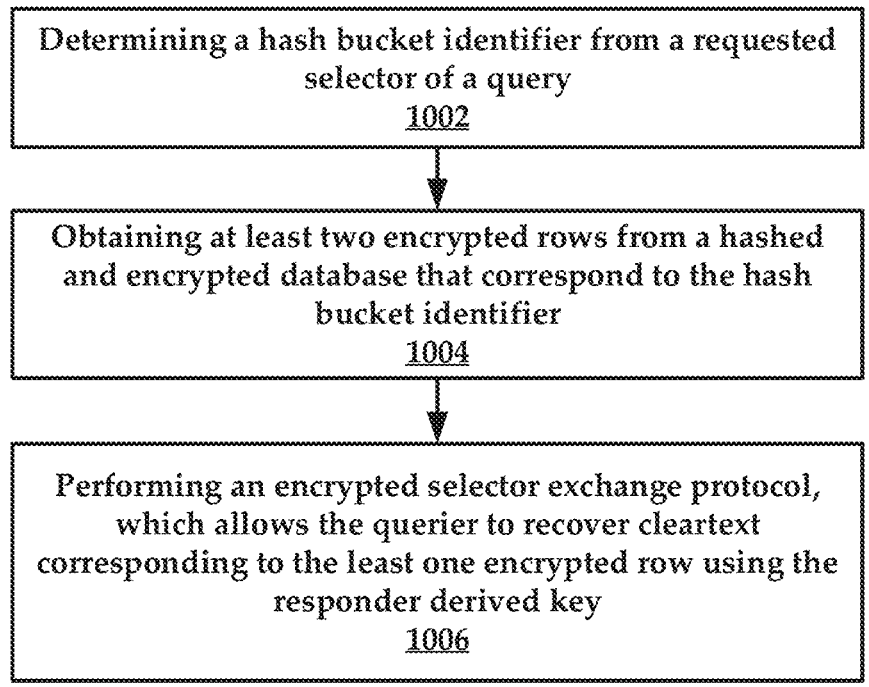
FIG. 10 is a flowchart of another method of the present disclosure.

FIG. 10 is a flowchart of another example method. The method includes a step 1002 of determining a hash bucket identifier from a requested selector of a query. Next, the method includes a step 1004 of obtaining at least two encrypted rows from a hashed and encrypted database that correspond to the hash bucket identifier. To be sure, the at least two encrypted rows comprising at least one encrypted row that does not correspond to the requested selector, but was based on a bucket identifier collision, and at least one encrypted row that does correspond to the requested selector.

The method can include a step 1006 of performing an encrypted selector exchange protocol, which allows the querier to recover cleartext corresponding to the least one encrypted row using the responder derived key. To be sure, the at least one encrypted row that does not correspond to the requested selector cannot be decrypted using the responder derived key.

Figure 11:
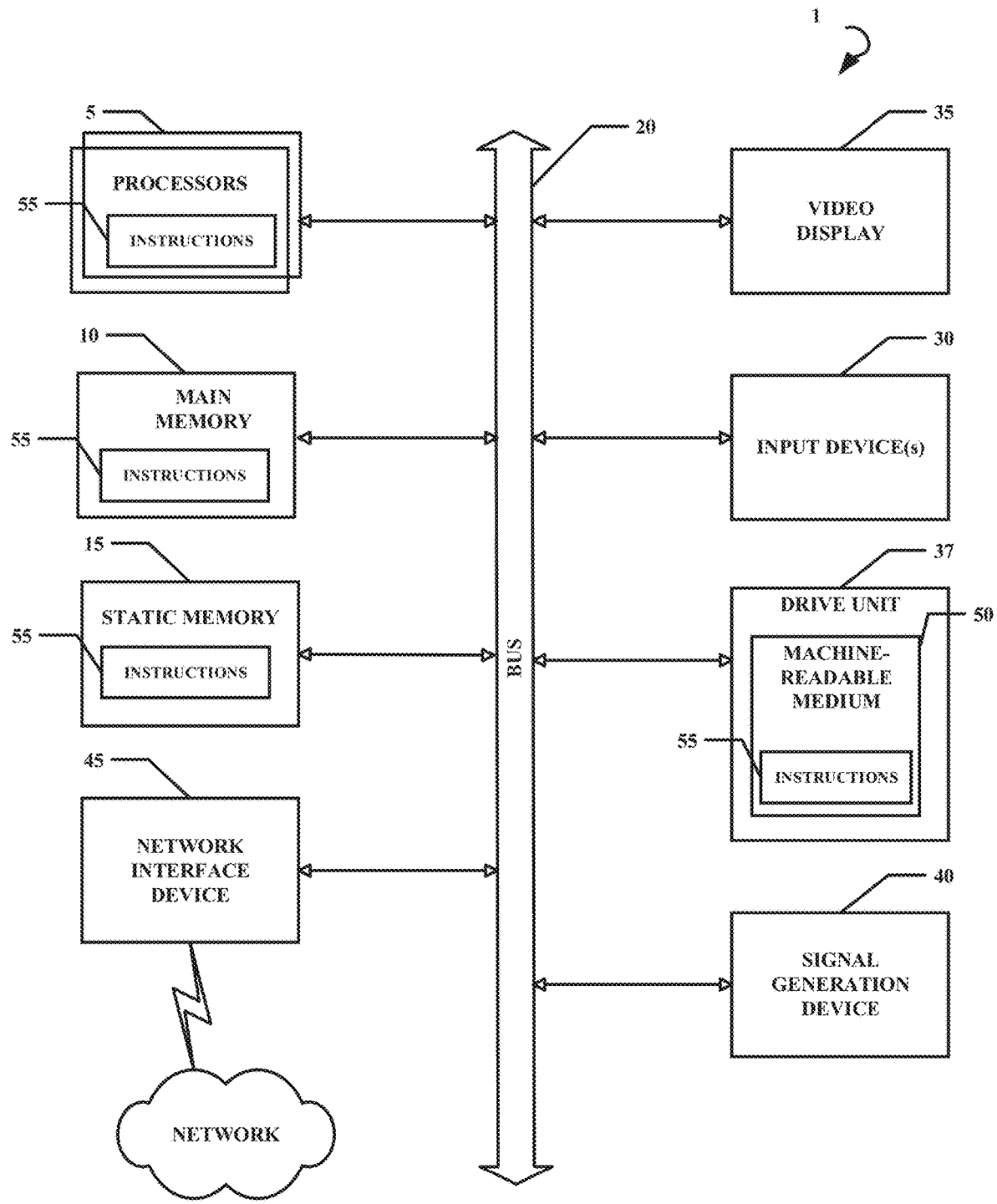
FIG. 11 is a computer system that can be used to implement various embodiments of the present disclosure.

FIG. 11 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
    generating, by a responder, a hashed and encrypted database from a cleartext database by:
        encrypting selectors of the cleartext database using a responder key of a commutative encryption scheme, each selector being assigned a bucket identifier;
        encrypting rows of the cleartext database with responder derived keys generated from the encrypted selectors;
        grouping the encrypted rows, by the responder, according to bucket identifiers;
        determining, by the responder, a hash bucket identifier of a query based on a requested selector of a query; and
        returning at least two encrypted rows corresponding to the hash bucket identifier, the at least two encrypted rows comprising at least one encrypted row that does not correspond to the requested selector, but was based on a bucket identifier collision, and at least one encrypted row that does correspond to the requested selector; and
    performing an encrypted selector exchange protocol between a querier and the responder that comprises:
        encrypting the requested selector a first time, by the querier, using a querier key;
        encrypting the requested selector a second time, by the responder, using the responder key to create a twice encrypted selector;
        receiving, by the querier, the twice encrypted selector;
        decrypting, by the querier, the twice encrypted selector using the querier key to obtain the requested selector that was encrypted with the responder key; and
        deriving, by the querier, the responder derived key used to encrypt the at least one encrypted row that does correspond to the requested selector to recover cleartext corresponding to the at least one encrypted row, the querier being unable to decrypt the at least one encrypted row that does not correspond to the requested selector.

2. The method according to claim 1, wherein two or more of the encrypted rows have the same bucket identifier.

3. The method according to claim 1, wherein the querier key and the responder key are identical.

4. The method according to claim 1, wherein the commutative encryption scheme comprises at least one of elliptic curve cryptography, Pohlig-Hellman, and/or Shamir, Rivest and Aldeman.

5. The method according to claim 1, wherein the responder derived keys are created using a hashing function.

6. The method according to claim 5, wherein the hashing function is SHA256.

7. The method according to claim 1, wherein the commutative encryption scheme is deterministic.

8. A method, comprising:
    determining, by a responder, a hash bucket identifier from a requested selector of a query;
    obtaining at least two encrypted rows from a hashed and encrypted database that correspond to the hash bucket identifier, the at least two encrypted rows comprising at least one encrypted row that does not correspond to the requested selector, but was based on a bucket identifier collision, and at least one encrypted row that does correspond to the requested selector; and
    performing an encrypted selector exchange protocol between a querier and the responder that comprises:
        encrypting the requested selector a first time using a querier key;
        encrypting the requested selector a second time using a responder key to create a twice encrypted selector;
        decrypting the twice encrypted selector using the querier key to obtain the requested selector that was encrypted with the responder key;
        deriving a responder derived key used to encrypt the at least one encrypted row that does correspond to the requested selector; and
        recovering cleartext corresponding to the at least one encrypted row using the responder derived key, wherein the at least one encrypted row that does not correspond to the requested selector cannot be decrypted using the responder derived key.

9. The method according to claim 8, wherein the at least one encrypted row that does not correspond to the requested selector cannot be decrypted using the responder derived key because it was encrypted using a different responder derived key.

10. The method according to claim 8, further comprising generating the hashed and encrypted database by encrypting selectors of a cleartext database using a responder key, each selector being assigned a bucket identifier.

11. The method according to claim 10, further comprising encrypting rows of the cleartext database with responder derived keys generated from the encrypted selectors.

12. The method according to claim 11, further comprising grouping the encrypted rows, by the responder, according to bucket identifiers.

13. The method according to claim 12, further comprising determining a hash bucket identifier of a query based on a requested selector of a query.

14. The method according to claim 8, wherein the responder key and the querier key are part of a commutative encryption scheme.

15. The method according to claim 14, wherein the commutative encryption scheme is deterministic.

16. The method according to claim 8, wherein responder derived keys are created using SHA256.

17. A system, comprising:
    a responder comprising a processor; and memory for storing instructions, the processor executing the instructions to:

generate a hashed and encrypted database from a cleartext database as the responder:
  encrypts selectors of the cleartext database using a responder key, each selector being assigned a bucket identifier;
  encrypts rows of the cleartext database with responder derived keys generated from the encrypted selectors;
  groups the encrypted rows, by the responder, according to bucket identifiers;
  determines, by the responder, a hash bucket identifier of a query based on a requested selector of a query; and
  returns at least one encrypted row that does correspond to the requested selector.

18. The system according to claim 17, wherein the responder is configured to return at least two encrypted rows corresponding to the hash bucket identifier, the at least two encrypted rows comprising at least one encrypted row that does not correspond to the requested selector, but was based on a bucket identifier collision.

19. The system according to claim 17, wherein the responder performs an encrypted selector exchange protocol as the processor executes the instructions to:
  receive the requested selector that has been encrypted a first time, by a querier, using a querier key;
  encrypt the requested selector a second time, by the responder, using the responder key to create a twice encrypted selector; and
  transmit to the querier, the twice encrypted selector.

20. The system according to claim 19, further comprising the querier, the querier being configured to:
  decrypt the twice encrypted selector using the querier key to obtain the requested selector that was encrypted with the responder key; and
  derive a responder derived key used to encrypt the at least one encrypted row that does correspond to the requested selector to recover cleartext corresponding to the at least one encrypted row, the querier being unable to decrypt at least one encrypted row that does not correspond to the requested selector.

* * * * *